No. 655,878. Patented Aug. 14, 1900.
H. LIEBERT.
MACHINE FOR MILLING SCREWS, &c.
(Application filed Dec. 12, 1899.)
(No Model.) 2 Sheets—Sheet 1.
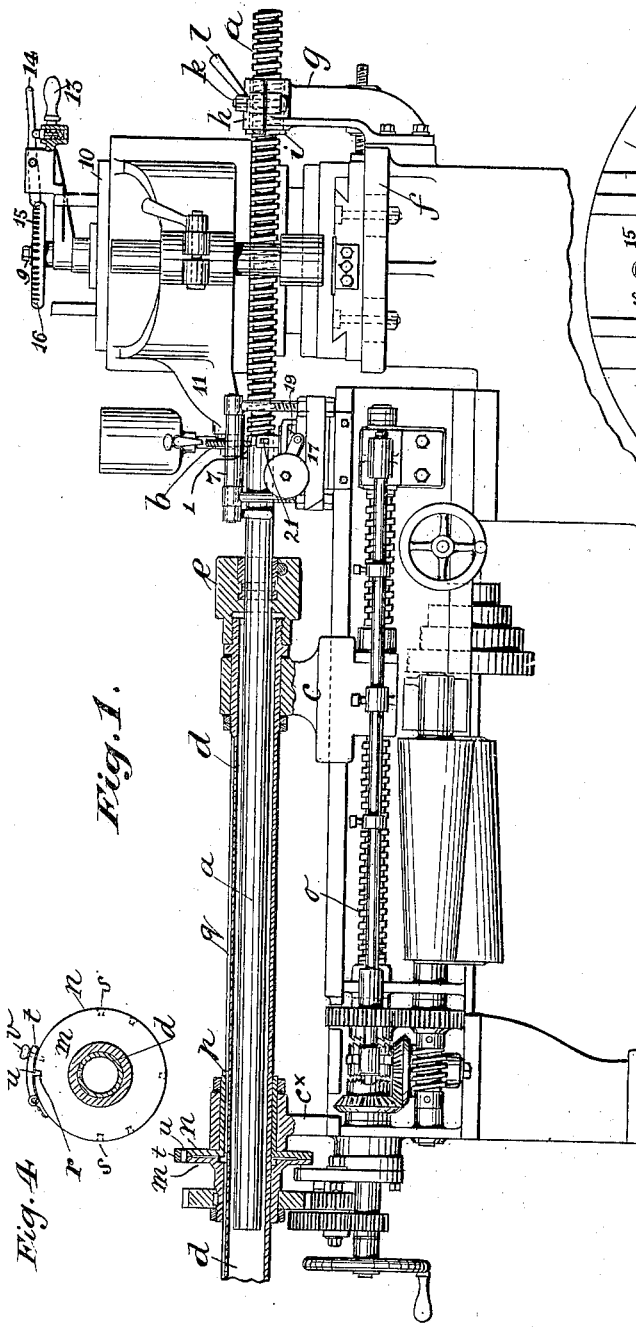
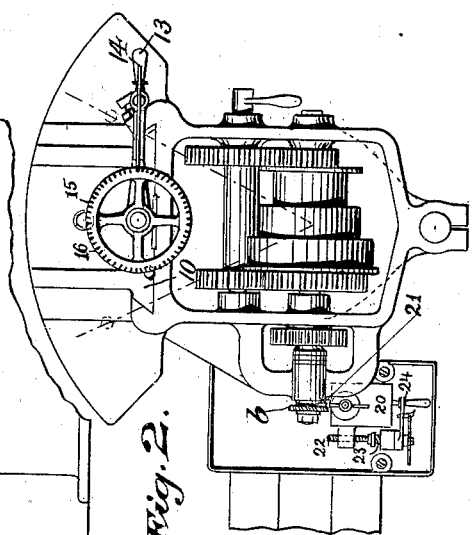
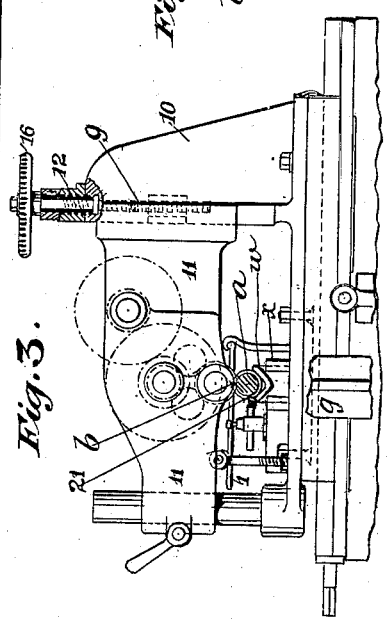
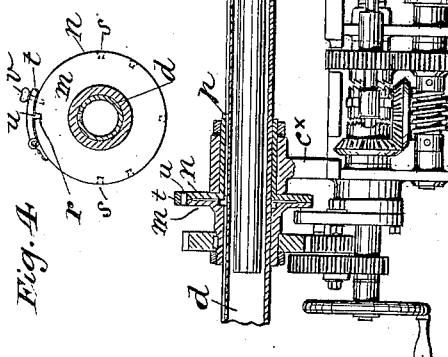
WITNESSES:
Ella L. Giles
INVENTOR
Henry Liebert
BY Richards
ATTORNEYS No. 655,878. Patented Aug. 14, 1900.
H. LIEBERT.
MACHINE FOR MILLING SCREWS, &c.
(Application filed Dec. 12, 1899.)
(No Model.) 2 Sheets—Sheet 2.
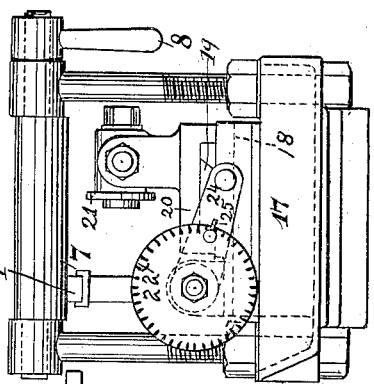
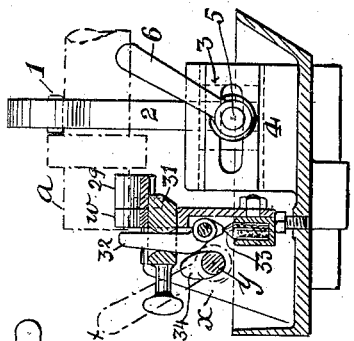
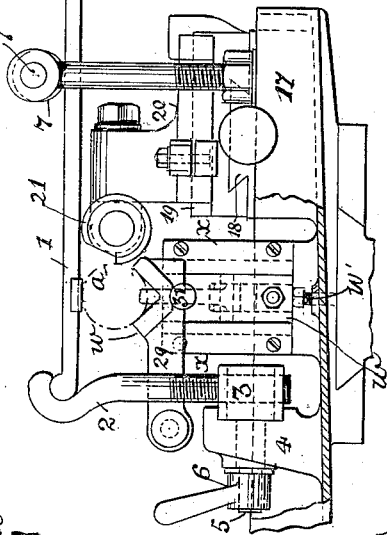
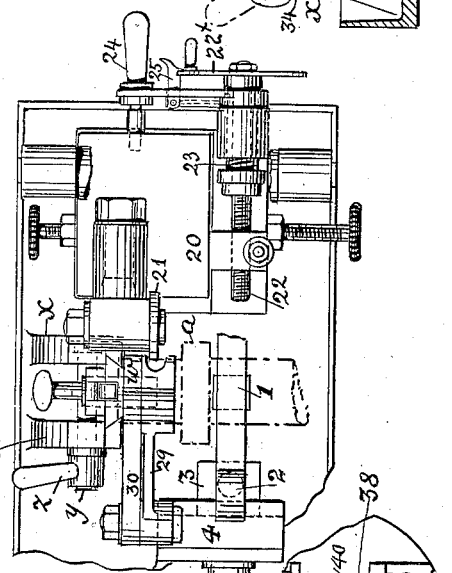
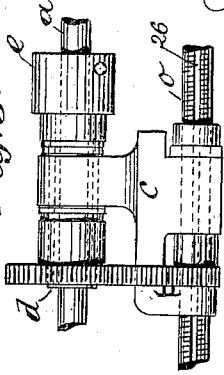
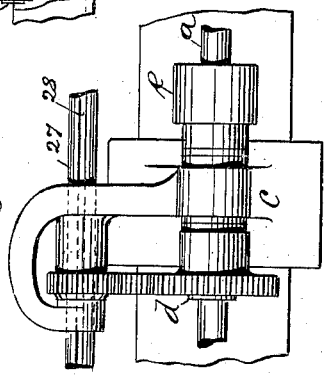
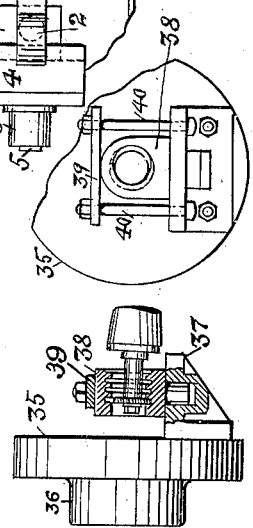
WITNESSES:
INVENTOR
Henry Liebert
BY Richards
ATTORNEYS

UNITED STATES PATENT OFFICE.

HENRY LIEBERT, OF MILNROW, ENGLAND.

MACHINE FOR MILLING SCREWS, &c.

SPECIFICATION forming part of Letters Patent No. 655,878, dated August 14, 1900.

Application filed December 12, 1899. Serial No. 740,078. (No model.)

*To all whom it may concern:*

Be it known that I, HENRY LIEBERT, a subject of the Queen of Great Britain, residing at Milnrow, in the county of Lancaster, England, (whose post-office address is Perseverance Works, Milnrow,) have invented new and useful Improvements in Machines for Milling Screws, Worms, and the Like, (for which I have made application for patent in Great Britain, No. 11,205, bearing date May 30, 1899,) of which the following is a specification.

My invention relates to improvements in machines for milling screws, worms, and the like; and the objects are, first, to provide means whereby long lengths of screws or worms can be milled in a short machine; secondly, means for milling multiple threads; thirdly, means for milling nuts or internal screws; fourthly, improved means for supporting the work while being milled; fifthly, means for taking the bur off the thread milled, and, lastly, means for quickly raising the milling-tool out of and lowering same into the thread again without altering its position relative to the work. I attain these objects by the mechanism illustrated in the accompanying two sheets of drawings, in which—

Figure 1, Sheet I, is a sectional elevation of a machine for milling screws, worms, and the like. Fig. 2 is a partial plan, and Figs. 3, $3^\times$, and 4 are end views of Fig. 1. Figs. 5 and 6, Sheet II, are respectively an elevation and a plan of two modifications of my invention in respect of the driving of the work-tube. Figs. 7, 8, 9, and 10 are respectively an end view, plan, front view, and sectional back view of the thread milling and cutting mechanism of machine enlarged. Figs. 11 and 12 are respectively a sectional elevation and end view of a special form of chuck used in connection with my invention.

Similar characters refer to similar parts throughout the several views.

In carrying out my invention and referring to Sheet I, Fig. 1, instead of employing a solid spindle to rotate and feed the work $a$ under the milling-tool $b$ I mount in the work-carriage $c$ a hollow spindle or tube $d$, supported at its outer end by the stationary bearing $c^\times$ and furnished at its inner end with a chuck $e$, while at the headstock end I secure to the bed $f$ of the machine a bracket $g$, adapted to grip the work $a$. The gripping-bracket $g$ is formed, preferably, with a split boss $h$, adapted to receive interchangeable bushes $i$, each having a different bore to suit the various diameters of work. (See Figs. 1 and $3^\times$.) These bushes are also split and by a bolt $k$ and nut $l$ employed in the split part of the said boss can be drawn tight around the work when required to hold it, as hereinafter described.

In order to enable of milling multiple threads, Figs. 1 and 4, I employ two disks $m$ $n$, $m$ being rotated, say, from the feed-screw $o$, as shown, and $n$ secured to the tube $d$ by a key $p$; engaging in a keyway $q$, formed along the whole length of the said tube. In the periphery of the disk $m$ a notch $r$ is formed, and in that of $n$ a number of notches $s$ at suitable distances apart from each other and in number equal to the number of threads to be cut. To the disk $m$ is hinged a latch $t$, having a tongue $u$ adapted to engage in the notch $r$ in the disk $m$ and in one of the notches $s$ of the disk $n$, so that by turning the disk $n$ and the tube $d$ the relative position of the said disks can be varied. The latch $t$ is also furnished with a screw $v$, adapted to enter the disk $m$, so that the two disks when set as required can be securely locked together.

In lieu of milling only one thread at a time I may mill two or more simultaneously by employing a corresponding number of cutters formed in one out of the solid or formed separately but secured upon the same spindle, as will be readily understood.

In lieu of employing in connection with the milling-tool a pedestal which encircles the work I support the work by a V-shaped step $w$, clamped and rendered vertically adjustable between two ways $x$ $x$ by means of a screwed bolt $w'$. In order to prevent the work from lifting out of the said step, I employ a bar 1 over it, one end of which is loosely linked onto a stud 2, screwed vertically adjustable into a slide 3, rendered horizontally adjustable in a pedestal 4 by means of the bolt 5 and nut 6, having a handle, so that the said bar may be raised or lowered and moved right or left to accommodate the various sizes and shapes of work. The free end of the bar 1 is placed under the influence of an eccentric 7, furnished with a handle 8, whereby the said bar can be more or less pressed upon the work as may be required. In lieu of the said eccentric a weight or a screw may be used to obtain the required pressure, the said screw being mounted in a nut rendered laterally adjustable, so as to coincide with the position of the said bar into which it may be moved, as will be readily understood. The former plan, however, is preferable.

In order to permit of lifting the milling-tool $b$ out of the thread cut in the work and to lower same again quickly to exactly the same depth to which it has been set by the screw-spindle 9, I employ in the neck of the bracket 10, on which the tool-bracket 11 is vertically adjusted by the screw-spindle 9, a bush 12, having externally a quick thread engaging in a thread formed in the said neck and having a handle 13, Figs. 1 and 3. This handle carries a spring-lever 14, (see Fig. 1,) adapted to engage in notches 15, formed in the hand-wheel 16 of the screw-spindle 9, so that when giving the handle 13 half a turn the said bush and screw-spindle turn and rise simultaneously, which causes the bracket 11 to be bodily lifted and the milling-tool raised out of the work, while on the return movement of the handle 13 the milling-tool is lowered again into its former position.

By depressing the spring-lever 14 the screw-spindle 9 is liberated from the bush-handle 13 and by means of its hand-wheel 16 can then be turned at will, and the milling-tool thus set to any desired depth.

The slide 17, which carries the V-step $w$, is formed with a bed 18, upon which is mounted longitudinally adjustable the bed 19, furnished with the slide 20, carrying the tool 21, by which the threads milled may be freed from burs or otherwise operated upon if required. The said tool may be of the ordinary kind used for cutting threads, as shown in Figs. 2 and 3, or it may be circular, as shown in Figs. 7, 8, and 9, or I may use a rotary cutter where no great accuracy is required. The screw 22, by which the slide 20 and its tool 21 is set relative to its work, I also mount in an externally-threaded bush 23, having a handle 24 and carrying a spring-lever 25, engaging in the hand-wheel $22^\times$ of the screw 22, for the purpose of quickly withdrawing and setting the tool 21 again to its former position, as previously described in respect of the milling-tool.

When using more than one milling-tool $b$, an equal number of finishing-tools 21 may also be employed side by side.

The screw and the like milling-machine described work as follows: The work $a$ to be screw-threaded is in such a manner secured into the hollow spindle $d$ by the chuck $e$ that it projects from the latter sufficiently to be gripped by the bracket $g$ after the carriage $c$ has arrived in the position shown in Fig. 1. As the spindle $d$ and the work secured thereto are rotated and fed forward together the milling-tool $b$ first cuts the thread into the work, after which the tool 21 immediately enters and finishes the thread, so that the two operations are practically performed simultaneously. After having milled a length such as shown in Fig. 1 the work is gripped at its farthest point by the gripping-bracket $g$ and released by the chuck $e$ at the opposite point, the tube-carriage $c$ then moved back to the tail of the machine by a quick return—say such as shown in Fig. 1—the work secured again in the tube $d$ and released by the said gripping-bracket $g$, after which the operation is repeated until the whole length of the work has been milled. In lieu of rotating the tube in which the work is secured by a train of wheels employed at the tail end of the machine I may form the guide-screw $o$ with a key-bed 26 (see Fig. 5) and employ a train of wheels adapted to travel along with the work-carriage $c$ and rotate the work-tube $d$ at the same time, or I may employ a shaft 27, having a keyway 28 at the back of the machine, (see Fig. 6,) and drive the same from the guide-screw by a train of wheels at the tail end and the work-tube $d$ by a train of wheels adapted to slide with the work-carriage $c$ and rotated by the said shaft.

In order to permit of milling threads on objects, such as studs, having shoulders in such a manner that the thread can be milled right up to the shoulder, I have modified the form of work-support, as shown in Figs. 7, 8, 9, and 10, Sheet II—$i.\ e.$, I form the upper end of the V-step $w$ in two parts, so as to be able of reducing the length thereof, and thus allow of feeding the stud with its shoulder right up against the milling-tool. One of the said parts forms an arm 29, one end of which is hinged to an arm 30, formed on the V-step $w$, and the other supported by a sliding bolt 31, retained in its normal position by a lever 32, controlled by a spring-catch 33. The upper end of the lever 32 projects in front of the stud or work $a$, so that when the end of the same comes in contact therewith it will be pushed back, and through the action of the spring-catch 33 afterward entirely withdrawn from underneath the arm 29, which latter then drops and allows the shoulder of the stud to feed up to the stationary part of the V-step. The bolt 31 and spring-catch can be returned into their normal position by a cam 34, bearing against the lever 32. Nuts or internal screws may be also milled on this machine, for which purpose I employ a special chuck (see Figs. 11 and 12) secured into the chuck on the work-tube aforesaid. This chuck is made in the form of a face-plate 35, having a shank 36, by which it is secured onto the said work-tube $d$, and on its face a table 37, rendered diametrically adjustable, to which the nut or internal screw 38 to be milled is clamped, say, by a bar 39 and two bolts 40.

What I claim as my invention, and desire to secure by Letters Patent, is—

1. In a machine for milling screws, worms and the like, the feed-carriage c furnished with a hollow spindle d adapted to rotate therein and provided with means for securing the work thereto, and means for turning the spindle d, said means having a splined connection with the spindle d, a screw for moving the carriage and connections between the same and the spindle-driving means, substantially as described.

2. In a machine for milling screws, worms and the like, in combination with the hollow work-spindle, two disks m and n one of which is splined thereto and the other rotated loosely thereon and means for coupling together and varying the relative position of the said disks, and means for driving the loose disk whereby the position of the hollow work-spindle may be varied in relation to the driving means and tool, all substantially as and for the purpose set forth.

3. In a machine for milling screws, worms and the like, the work-support furnished with a vertically-adjustable V-step w adapted to support the work, in combination with a bar 1 rendered vertically and horizontally adjustable and adapted to press upon and hold the work in the said step, all substantially as set forth.

4. In a machine for milling screws, worms and the like, the screwed spindle g mounted in a bush 12 which is rendered vertically adjustable in the bracket 10 carrying the milling-tool bracket 11 and means for locking the said spindle and bush together, against rotary movement relative to each other, all substantially as and for the purpose set forth.

5. In a machine for milling screws, worms and the like, in combination the hollow spindle d provided with means for securing the work therein, means for simultaneously rotating and longitudinally moving the said spindle, a milling-tool b and a turning-tool 21 employed stationary in relation to the longitudinal movement of the said hollow spindle and adapted to operate jointly upon the work, the said milling-cutter serving to mill the thread into the work in one cut and the said turning-tool to enter between and finish the thread milled by the said cutter, all substantially as set forth.

In witness whereof I have hereunto set my hand in presence of two witnesses.

HENRY LIEBERT.

Witnesses:
ALFRED BOSSHARDT,
STANLEY E. BRAMALL.